US011408403B2

(12) United States Patent
Ngan et al.

(10) Patent No.: US 11,408,403 B2
(45) Date of Patent: Aug. 9, 2022

(54) METAL HYDROXIDES BASED ACTUATOR WITH POLYMERIC SUPPORTING FILM

(71) Applicant: THE UNIVERSITY OF HONG KONG, Hong Kong (HK)

(72) Inventors: Alfonso Hing Wan Ngan, Hong Kong (HK); Kin Wa Kwan, Hong Kong (HK); Runni Wu, Hong Kong (HK)

(73) Assignee: THE UNIVERSITY OF HONG KONG, Hong Kong (HK)

( * ) Notice: Subject to any disclaimer, the term of this patent is extended or adjusted under 35 U.S.C. 154(b) by 0 days.

(21) Appl. No.: 17/422,760

(22) PCT Filed: Feb. 4, 2020

(86) PCT No.: PCT/CN2020/074261
§ 371 (c)(1),
(2) Date: Jul. 14, 2021

(87) PCT Pub. No.: WO2020/173285
PCT Pub. Date: Sep. 3, 2020

(65) Prior Publication Data
US 2022/0128045 A1    Apr. 28, 2022

Related U.S. Application Data

(60) Provisional application No. 62/811,023, filed on Feb. 27, 2019.

(51) Int. Cl.
*F03G 7/06* (2006.01)
*C01G 53/04* (2006.01)
(Continued)

(52) U.S. Cl.
CPC ........... *F03G 7/0616* (2021.08); *C01G 53/04* (2013.01); *C08J 7/06* (2013.01); *C25D 1/08* (2013.01);
(Continued)

(58) Field of Classification Search
CPC ..... F03G 7/0616; F03G 7/0612; C01G 53/04; C08J 7/06; C08J 2369/00; C25D 1/08; C01P 2006/40
(Continued)

(56) References Cited

U.S. PATENT DOCUMENTS 6,628,040 B2 *  9/2003  Pelrine .................... F04B 17/00
                                                310/309
2008/0211341 A1 *  9/2008  Pelrine ................. B62D 57/024
                                                310/309
(Continued)

OTHER PUBLICATIONS

International Search Report and Written Opinion for International Application No. PCT/CN2020/074261 dated Apr. 24, 2020, 6 pages.

*Primary Examiner* — Hoang M Nguyen
(74) *Attorney, Agent, or Firm* — Amin, Turocy & Watson, LLP (57) ABSTRACT

Disclosed are actuators containing an active layer comprising at least one metal hydroxide, the active layer having a first volume under no stimulation and a second volume either greater than or smaller than the first volume under stimulation; and a passive layer comprising a porous polymer membrane, the passive layer having an elastic modulus at least half of an elastic modulus of the active layer.

5 Claims, 10 Drawing Sheets

(51) Int. Cl.
*C25D 1/08* (2006.01)
*C08J 7/06* (2006.01)

(52) U.S. Cl.
CPC ........ *F03G 7/0612* (2021.08); *C01P 2006/40* (2013.01); *C08J 2369/00* (2013.01)

(58) Field of Classification Search
USPC .............................. 60/527–529; 310/305–309
See application file for complete search history.

(56) References Cited

U.S. PATENT DOCUMENTS

| | | | |
|---|---|---|---|
| 2009/0163647 A1* | 6/2009 | DeLuca | B82Y 30/00 |
| | | | 524/588 |
| 2013/0328443 A1 | 12/2013 | Tanaka et al. | |
| 2018/0076484 A1* | 3/2018 | Nakatsutsumi | H01M 4/525 |

* cited by examiner

METAL HYDROXIDES BASED ACTUATOR WITH POLYMERIC SUPPORTING FILM

BACKGROUND

An actuator is a device that moves and/or controls a mechanism or system. Generally, an actuator requires a control stimulus and a source of energy. When the actuator receives a control stimulus, the actuator responds by converting the stimulus into mechanical motion. Actuators are used for a myriad of purposes.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

One aspect of the invention relates to an actuator, comprising: an active layer comprising at least one metal hydroxide, the active layer having a first volume under no stimulation and a second volume either greater than or smaller than the first volume under stimulation; and a passive layer comprising a porous polymer membrane, the passive layer having an elastic modulus at least half of an elastic modulus of the active layer.

Another aspect of the invention relates to the contents described in Appendix A and appearing at the end of this document.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

The actuators described herein contain a metal hydroxide component where application of stimulants such as voltage, current, light, heat, or humidity or a combination of them to the component generates a volumetric or dimensional change of the metal hydroxide component. The volumetric or dimensional change produces mechanical work. The actuators are useful in various applications, including miniaturized actuator settings.

The actuators described herein include miniaturized actuators, made of metal hydroxides supported by polymeric films, that function by producing force and displacement under electrical and/or light stimulation. In smaller and self-contained environments, the actuators can be applied in microrobotics or microscale devices in which conventional actuators are too bulky to be used. Nickel hydroxides, widely used in Ni-MH rechargeable batteries, can be used in which the charging/discharging cause volume changes in the hydroxides due to the redox reactions induced. This effect is developed into bi-layered actuators, with the hydroxide supported by a metal film, that can bend under stimulations. The subject matter herein improves the actuators by (i) using polymeric film as the supporting layer which can substantially increase the curvature of the actuation due to the low elastic modulus of the film, (ii) using the hydroxides of other metals that can increase the stability of the actuation, and/or (iii) increase the temperature of the fabrication that can speed up the manufacturing process. Alternatively and/or additionally, the inventive subject matter herein involves the usage of polymeric supporting film, which can only be achieved with the proper choice of material to ensure the good adhesion between the hydroxides and the polymer with a large difference in elastic modulus. Other aspects include the use of other metal hydroxides e.g. cobalt and manganese to make actuators with more stable actuation and the speeding up of the fabrication through increasing the temperature.

In part, the subject matter described herein resolves at least one of three issues concerning an electrochemical actuation behavior of the $Ni(OH)_2$/NiOOH material system, namely, (i) can larger device strains be produced by more proper material engineering in the bi-layer cantilever construction of the actuator, and/or (ii) what are the electrochemical actuation stress-strain characteristics of $Ni(OH)_2$/NiOOH, and/or (iii) can complex and controllable motions be achieved by a simpler method.

According to Stoney's theory, in a bi-layered cantilever actuator comprising an active actuating layer adhered to a passive substrate layer, the bending curvature κ developed is given by $$\kappa \approx \frac{6h_a}{E_s h_s^2}\sigma_a \quad (1)$$

where $\sigma_a$ is the intrinsic actuation stress of the actuating layer and $h_a$ is its thickness, and $E_s$ and $h_s$ are the Young modulus and thickness of the passive substrate, respectively. Therefore, a large bending curvature is achieved by choosing a substrate material with a low modulus. Furthermore, the substrate material has a large elastic limit and good adhesion with the active material, so that it will not substantially yield, crack or delaminate during the actuation. In this regard, polymers are superior to metals or ceramics in terms of elastic compliance and limit; however, their intrinsic adhesion with the $Ni(OH)_2$/NiOOH active material may not be strong enough. To address the adhesion problem, nanoporous polycarbonate (PC) is utilized, for example, as the material for the passive layer for the bi-layered construction of cantilever actuators. Compared with the metal passive substrates used previously, PC has a Young's modulus which is two orders of magnitude lower, and this allows larger actuation strains to be delivered by the active Ni (OH)$_2$/NiOOH material. Yet, the nanoporous nature of PC improves the adhesion with the active layer via mechanical interlock effects at the interface. Such actuators exhibit ultra-large angular displacements of >1000° in alkaline electrolyte under driving potentials of less than 1 V. A fast response time of under 2 s to achieve the full actuation is also observed, and the compliant and ductile substrate can easily be folded with predetermined creases, used as "origami actuators".

Metal hydroxides include both metal hydroxides per se and metal oxides, often in a redox relationship. Examples of metal hydroxides include nickel oxides and hydroxides (such as $Ni(OH)_2$, NiOOH), cobalt oxides and hydroxides (such as $Co(OH)_2$, $[Co(OH)_4]^{2-}$, $[Co(OH)_6]^{4-}$), manganese oxides and hydroxides, iron oxides and hydroxides (such as $Fe(OH)_2$, $Fe_3O_4$), aluminum oxides and hydroxides (such as $Al(OH)_3$, $Al(OH)_4^-$, $Al_2O_3$, $AlO(OH)$), copper oxides and hydroxides (such as $Cu(OH)_2$, $[Cu(OH)_4]^{2-}$), and magnesium oxides and hydroxides.

The actuators have one or more metal hydroxides in a layer adhered polymer membrane. To improve adhesion, a porous polymer membrane, such as a nanoporous polymer membrane, can be used. The polymer membrane is made of a polymer having a relatively low elastic modulus. Examples of such polymers include polycarbonates, polyesters including polyethylene terephthalates (PET). Commercially available examples include polycarbonate Whatman® membranes from Nuclepore, PET Hostaphan® and Diafoil® films available from Mitsubishi Polyester Film, Inc., and polyester Lumirror™ films and para-aramid Mictron™ films available from Toray.

The actuators and methods described herein may produce an individual actuator that may undergo substantially the same change in orientation over multiple actuation cycles. In other words, the actuator can reproduce substantially the same change in orientation over at least 10, at least 100, at least 500, or greater, actuation cycles. Changes in orientation that are "substantially the same" are changes in orientation that differ by less than 5% of the average displacement of the actuator and/or of the average rate of displacement of the actuator.

Methods of actuation involve selecting one or more metal hydroxides and a polymer membrane to produce a desired change in orientation (e.g., a desired bending, buckling, folding, cupping). In some embodiments, the metal hydroxide has a particular shape, thickness, or other dimension and arranged to produce a desired displacement. The size, shape, and/or arrangement of the metal hydroxides and a polymer membrane can affect the method and degree of the change in orientation.

For electrochemical actuation: packaging the bi-layered actuators can be enabled for industrial applications, which can be done through sealing or using solid electrolyte. For light-induced actuation: an effective way to actuate and control arrays of actuator can be enabled for industrial applications, which can be done by using optical fibers to induce the actuation.

In summary, the actuators herein employ a very compliant material, namely, porous polycarbonate, to be the passive layer for a novel cantilever actuator design that is powered by the active material of, for example, $Ni(OH)_2$/NiOOH. The porous structure of the polycarbonate substrate allows the formation of interlocks with the active material to prevent the latter from delamination during actuation, and its low stiffness allows the active material to actuate up to an unprecedented large strain of ~0.6%. Over such a large actuation range, the active material is found to deliver a fairly constant actuating stress of ~20 MPa, which is large among known electrochemical actuators. At the largest actuation strain of 0.6% studied, the work density delivered is ~117 kJ/m$^3$, and the cumulative angular deflection of the free end of the actuator is >1000°, with curvature 1.2 mm$^{-1}$. The actuating material was also electrodeposited on pre-folded membranes to achieve finger-like motions. The printed micro-actuator with independently-controlled muscle group was fabricated in a simple method and various deformation shapes can be achieved by different stimuli combinations.

In one embodiment, the fabrication method involves electrodeposition, and a rate-determining step involving the hydroxides, which takes about 2 hours to complete. Another method to shorten the fabrication can be achieved by increasing the temperature of the electrodeposition. For example, the time for electrodepositing hydroxides can be increased by at least 2 times, for example, 8 times if the temperature increased from room temperature to 40° C. The choice of hydroxides involves cobalt, iron, manganese, aluminum, copper, magnesium, and nickel which exhibit at least some actuation.

The following examples illustrate the subject invention. Unless otherwise indicated in the following examples and elsewhere in the specification and claims, all parts and percentages are by weight, all temperatures are in degrees Centigrade, and pressure is at or near atmospheric pressure.

Experimental Methods

Fabrication of the Actuators.

Figure 1:
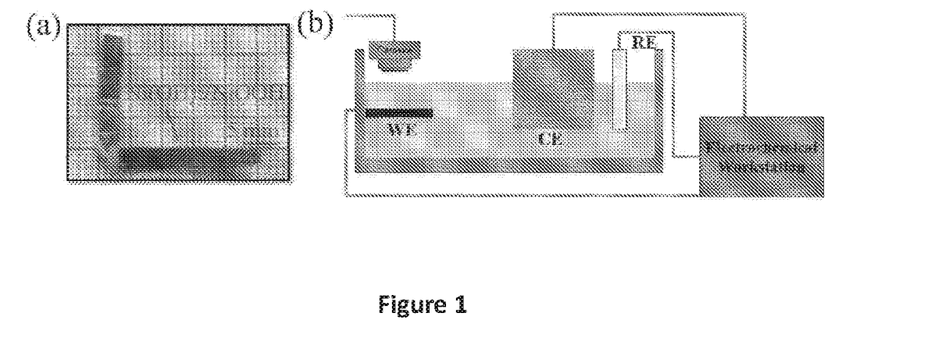
FIG. 1. (a) Photograph of a bi-layered actuator. (b) Schematic of the actuation tests setup for bi-layered actuator.

Experiments were carried out to illustrate metal oxides/hydroxides as efficient actuating materials, and porous polymeric membranes as suitable substrates offering excellent adhesion. Using $Ni(OH)_2/NiOOH$ as a typical metal oxide/hydroxide material and porous polycarbonate (PC) membranes as typical porous polymer substrates, active $Ni(OH)_2/NiOOH$ layers were electrodeposited on PC membranes (Whatman® Nuclepore Track-Etched Membrane, diameter: 25 mm, pore size: 3 μm) using an electrochemical workstation (LK2006A, Lanlike) in a beaker-type electrochemical cell equipped with a working electrode, a platinum mesh counter electrode, and a saturated calomel reference electrode. To metallize the PC membranes for the electrodeposition, they were first sputtered with a thin layer of Au of 14 nm thick, in a Bal-tec SCD 005 Sputter Coater (working distance: 50 mm, sputtering current: 30 mA, sputtering duration: 100 s). The Au-sputtered PC membranes were then used as the working electrodes in the electrodeposition process. The electrodepositing bath solution was 0.13 M $NiSO_4$, 0.1 M NaOAc and 0.13 M of $Na_2SO_4$ purchased from Sigma Aldrich and used as received.[10] An anodic current density of 1.2 mA/cm² for durations from 0.5 h to 2.5 h was applied under continuous and vigorous stirring, and this resulted in a layered film comprising a dark, uniform layer of $Ni(OH)_2/NiOOH$ on top of the Au-sputtered PC membrane. Such films were then cut into rectangular cantilevers measuring approximately 15 mm by 3 mm. A Cu tape (3M™) was adhered to an uncoated part of the Au-sputtered area to form an actuator as shown in FIG. 1a. For making independently-controllable actuators by 2D printing, the conductive areas of the membrane were separated by masking the membrane before sputtering Au. Then, pre-designed patterns were printed onto the membrane by using the micro-2D printer setup[23]. An electrolyte containing 0.6 M $NiSO_4$, 0.53 M NaOAc and 0.1 M of $Na_2SO_4$ was put into the syringe with a capacity of 3 mL, and a constant electrical potential of 2.05 V was applied on the membrane against the syringe needle to electrodeposit $Ni(OH)_2/NiOOH$. The inner diameter of needle was 0.51 mm, and the printing was performed at a moving speed of being 50 mm/minutes, with each actuating layer of 10 mm printed by cyclic scans to a total printing time of 20 minutes.

Physical Characterization.

Scanning electrode microscope (SEM) images were obtained with a LEO 1530 field-emission microscope to image the surface morphology and thickness of the $Ni(OH)_2/NiOOH$. The thickness of the membrane was measured by a stylus profiler (Bruker DektakXT™). Microstructural characterization was carried out by X-ray diffraction (XRD) and Fourier transform-infrared (FTIR) spectroscopy. XRD was performed in a Rigaku SmartLab diffractometer with a fixed incidence angle of 0.5° using a monochromatic Cu K-alpha source (wavelength=1.54056A), and an Au-sputtered substrate was first characterized for the purpose of comparison. Infrared measurements were performed at room temperature and an untreated substrate was used to set the datum of the instrument. Energy dispersive X-ray spectroscopy (EDX) in the LEO 1530 SEM was conducted for chemical characterization. TEM imaging and selected area electron diffraction (SAED) were performed in an FEI Tecnai G2 20 Scanning TEM.

Actuation Tests.

Actuation tests were carried out with the actuators submerged horizontally into an electrolyte of 1 M NaOH solution filling a rectangular glass container. One end of the actuator was fixed and connected to an electrochemical workstation (LK2006A, Lanlike) as the working electrode (FIG. 1b). Then, the actuation was electrochemically induced by the cyclic voltammetry mode of the workstation from 0 V to 0.8 V with respect to an Ag/AgCl reference electrode in a 3-electrode cell setup with a platinum mesh counter electrode. The free-end displacement was video-recorded and was further processed and analyzed by a motion tracking software Kinovea. The actuation performance of printed actuators was characterized by fixing them vertically in the same three electrode setup. Each muscle group was connected to a toggle switch which enabled the actuator to switch between input voltage of 0.0 V and 0.8 V.

Results

Microstructural Characterization.

Figure 2:
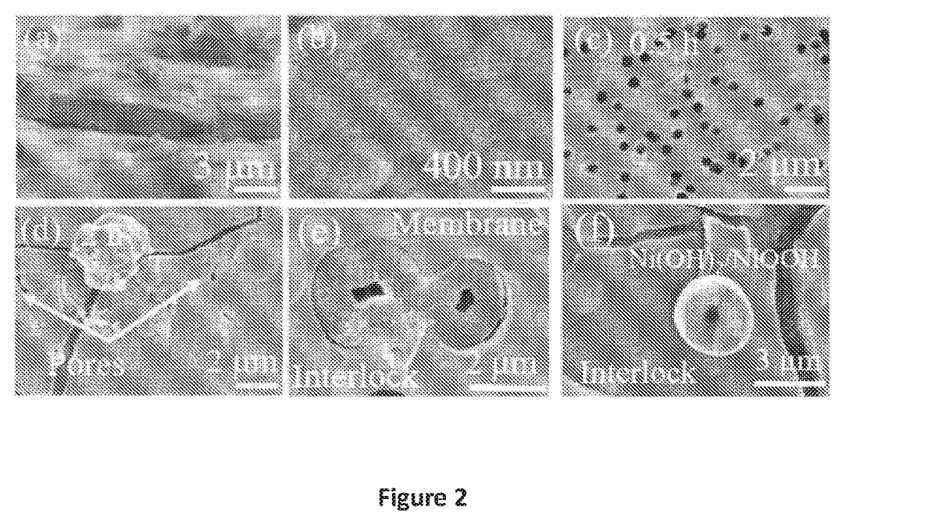
FIG. 2. (a,b) SEM images of the cross-section and the top surface of the electrodeposited $Ni(OH)_2/NiOOH$. (c,d) Surface morphology after 0.5 h and 2 h electrodeposition. (e) Peeled off surface of an Au-sputtered membrane with pores filled with interlocks and (f) underside of the actuating material showing an interlock.

FIG. 2a,b show the cross section and top surface of an electrodeposited $Ni(OH)_2/NiOOH$ layer, which is uniform and solid due to the vigorous stirring. Compared to a porous structure, a solid structure of the active layer has a larger Young's modulus which will enhance the performance of cantilever-actuator. As shown in the SEM images in FIG. 2c,d, after an electrodepositing time of 0.5 h or 2 h, the cylindrical pores of the PC membrane (Au-sputtered) were covered by a layer of $Ni(OH)_2/NiOOH$, and peeling it layer from the membrane revealed the deep deposition into the cylindrical pores as shown in FIG. 2e,f. The filling of $Ni(OH)_2/NiOOH$ into the pore channels of the Au-sputtered PC membrane is expected to increase the adhesion between the active and passer layers, which should improve the subsequent actuation performance of the actuator.

Figure 3:
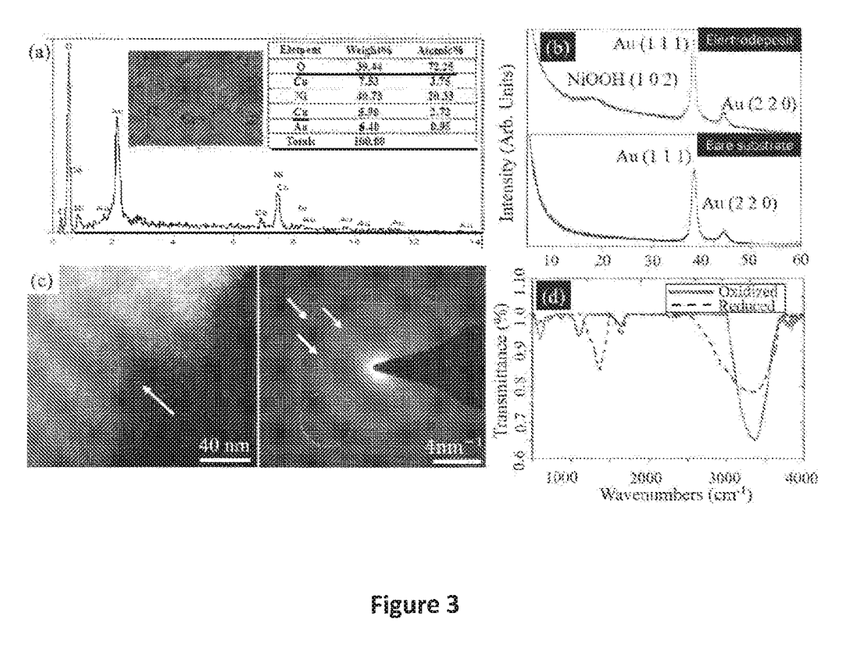
FIG. 3. Characterization of the active materials. (a) EDX results of actuating materials. (b) XRD results of freshly prepared samples (top) and bare substrates (bottom). (c) TEM dark field images of the freshly prepared samples taking using the portion of the diffraction pattern encircled. (d) FTIR results of oxidized and reduced actuating materials.

The EDX analysis of the electrodeposited active material in FIG. 3a shows that Ni and O were the dominant elements (with combined atomic 90), with a slight amount of Co possibly due to the impurity in the electrodeposition solution, and Au due to the sputtered Au on the membrane. For the XRD characterization, since the peaks from the PC membrane were found to overlap with those of the active material, Au-sputtered glass slide instead of PC was used as the substrate for the electrodeposition of the active material. The resultant XRD spectrum in FIG. 3b exhibited a broad and weak peak at $2\theta=18°$, which suggests that the corresponding material may be NiOOH with a poor crystalline structure. Another characteristic peak of NiOOH that should be found at 2θ=38.4° may be overwhelmed by the strong and sharp peaks of the sputtered Au on the glass slide as seen in FIG. 3b. FIG. 3c shows a dark-field TEM image of the electrodeposited active material, taken with an objective aperture position indicated by the dashed circle on the corresponding selected area diffraction pattern (SADP). Bright spots in the TEM image indicate small crystallites, and the inter-planar spacings measured from the diffraction rings in the SADP are 1.53, 2.15 and 2.62 Å respectively, indicating that the actuating layer may be a mix of Ni(OH)$_2$/NiOOH and NiO. Also, the broad diffraction rings seen in the SADP indicate the limited crystallinity of the actuating material, in good agreement with the XRD results in FIG. 3b.

FIG. 3d shows the FTIR spectra of a freshly electrodeposited sample of the active material in an oxidized state, and a sample which was reduced in air for 24 h after electrodeposition. A bare substrate of Au-sputtered FTO was first measured and the corresponding signals were removed from the spectra of the active materials, so that FIG. 3d shows only the characterization of the active materials. The spectrum of the reduced state exhibits two absorbed peaks at about 3455 cm$^{-1}$ land 1630 cm$^{-1}$, which are characteristics of the stretching vibration of hydroxyl groups and the bending modes of water molecules. The reduced state may therefore be mainly composed of α—Ni(OH)$_2$. At low wavenumbers, the band at about 630 cm$^{-1}$ can be associated with the bending vibrations of Ni—O—H. The relatively sharp peak at 575 cm$^{-1}$ in the oxidized state but not that obvious in the reduced state is attributed to the Ni$^3$—O bond vibration. The large broad peaks centered around 3500 cm$^{-1}$ in both the reduced and oxidized states can be associated with the stretching modes of water molecules intercalated in the interlayer space of Ni(OH)$_2$ and NiOOH. The intense peak at around 1200 cm$^{-1}$ in the oxidized state may be due to the C—O single bond, and the large peak at 1384 cm$^{-1}$ in the reduced state may correspond to the carbonate anions inserted in the interlayer space (i.e. carbonate dioxide was absorbed into the surface of materials). In FTIR, the blue shifts compared with those of the crystalline phase are possibly due to the many defects and disorder within the amorphous phase. Therefore, the peak at 510 cm$^{-1}$ may be due to the disordered Ni(OH)$_2$, which may be discussed in analogy with that of 550 cm$^{-1}$ peak exhibited by NiOOH.

Device Actuation Behavior.

Figure 4:
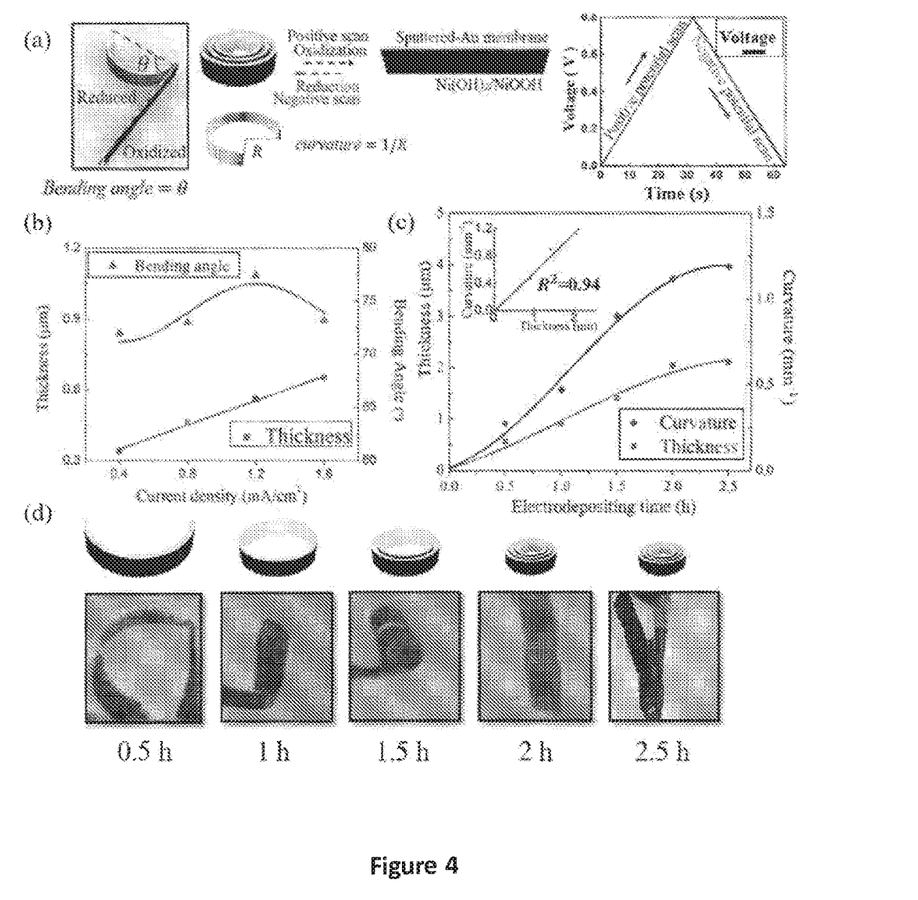
FIG. 4. Actuating performance under different fabrication methods. (a) Schematic showing bending angle and curvature during negative and positive potential scan (the active material layer is drawn as black, while the substrate is white). (b) Effects of current density for 0.5 h on thickness of electrodeposited $Ni(OH)_2/NiOOH$ layer and subsequent actuation bending. (c) Effects of electrodepositing time on the typical largest curvature, inset: relationship between curvature vs thickness. (d) Typical largest curvature during electrodeposition time ranging from 0.5 h to 2.5 h.

On applying cyclic potentials to the cantilever actuators in 1 M NaOH solution, sizable and reversible bending was observed. As shown in FIG. 4a, the actuator exhibited large curling motion towards the membrane side when reduced (during negative potential scan) and straightened or even curled backward to the side of the active material when oxidized (during positive potential scan). In other words, the actuating layer expanded during reduction, and contracted during oxidation. Because of the confining effect of the passive layer, the reversible bending of the actuator was caused by the expansion and contraction of the active Ni(OH)$_2$/NiOOH layer under reduction and oxidation, respectively. To optimize the design of the actuators, the effects of the current density used in the electrodeposition of Ni(OH)$_2$/NiOOH were first investigated. At an electrodepositing time of 0.5 h, FIG. 4b shows a directly linearly relation between the thickness of the electrodeposited Ni(OH)$_2$/NiOOH layer and the current density. The average bending angle of the first five actuation cycles first increases with the current density and then drops beyond 1.2 mA/cm$^2$, due likely to the poor adhesion of the Ni(OH)$_2$/NiOOH layer on the Au-sputtered PC membrane at the highest electrodepositing current density of 1.6 mA/cm$^2$, as evidenced by the occasional observation of the layer peeling off from the membrane. Therefore, the optimized current density is selected to be 1.2 mA/cm$^2$. FIG. 4c shows the effect of the electrodepositing time at current density of 1.2 mA/cm$^2$, on the thickness of the Ni(OH)$_2$/NiOOH layer and also the subsequent actuation maximum curvature. The results show that both the thickness of the actuating layer and the actuating curvature first increase approximately proportionally with the electrodepositing time but then saturate to steady values for the times larger than 2 h, and the curvature is approximately proportional to the thickness of the actuating layer as shown in the inset of FIG. 4c. The typical largest curvatures achieved over the potential scan covering the redox regime at different electrodepositing times are shown in FIG. 4d.

Figure 5:
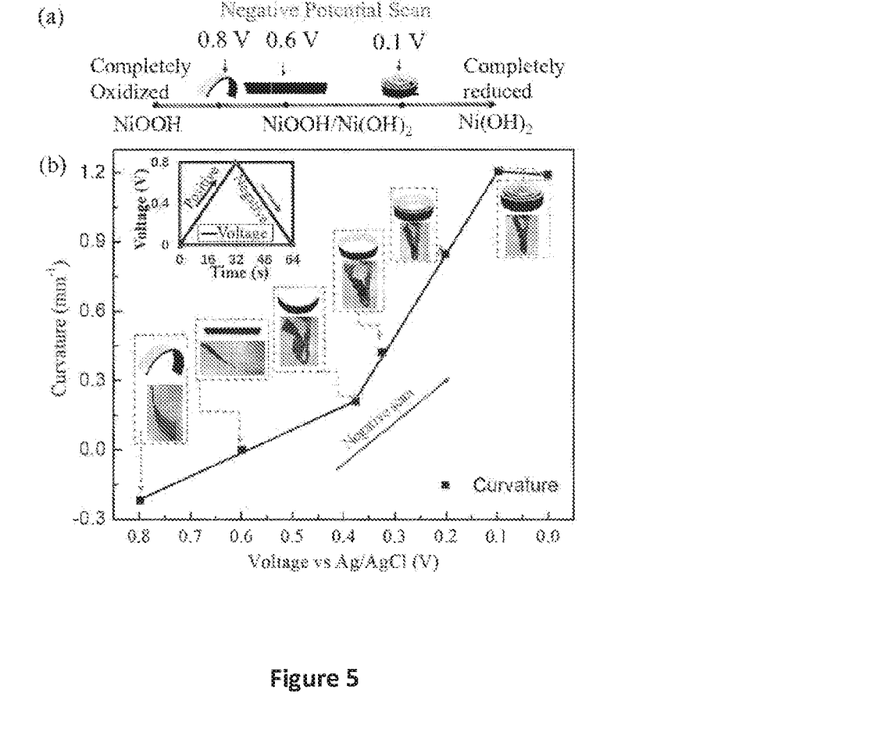
FIG. 5. (a) Curvature change trend from oxidized state to reduced state (half reduced cycle). (b) The curvature change during negative scan (half reduced cycle): Potential window of 0.8 V with scan rate 25 mV/s.
Figure 6:
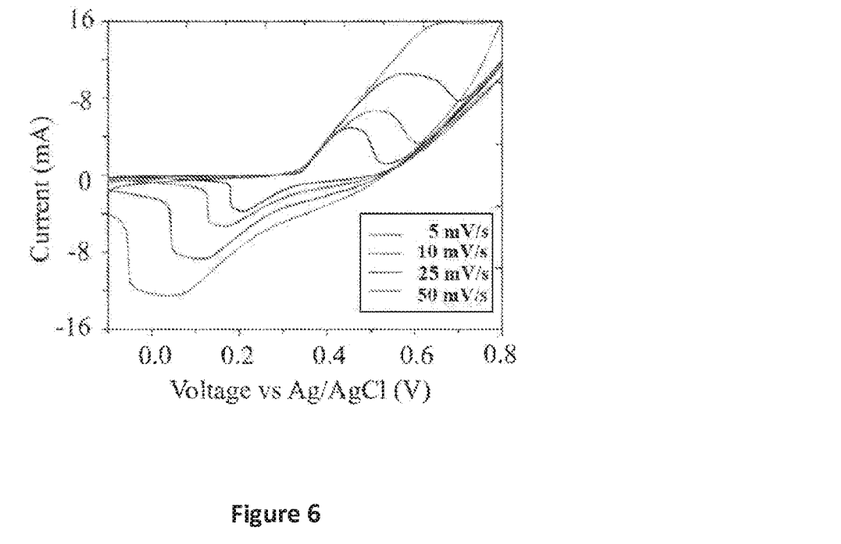
FIG. 6. CV curve at different scan rates.

For an actuator electrodeposited for 2.5 h with size 15 mm×3 mm, the curvature increases during the negative potential scan in the latter half of the potential cycle, because, during this process, an increasing amount of NiOOH was reduced to Ni(OH)$_2$, thus leading to a larger expansion effect and therefore larger curvature as shown schematically in FIG. 5a. Curvature increases more quickly after 0.4 V because of main faradic reaction reactions as it is shown in FIG. 6. A curvature as large as 1.2 mm$^{-1}$ with a cumulative angular deflection of >1000° (i.e. 2.8 revolutions) at the free-end can be achieved under at a scan rate of −25 mV/s from 0.8 V to 0 V that took place over 32 s (FIG. 5a,b). In addition, it is noted that the actuator exhibited a slight twisting motion alongside the bending actuation (FIG. 5b). This may be due to the slightly uneven deposition of the actuating material.

Cyclic voltammetry with different scan rates was performed to characterize the electrochemical properties of the actuating material. FIG. 6 shows typical CV curves for an actuator in 1 M NaOH at various scan rates in a potential window between −0.1 V and 0.8 V. The general shapes of the curves are very similar to those reported for the redox reaction of Ni(OH)$_2$/NiOOH in the literature.[29, 30] A pair of strong current peaks can be observed, indicating that the actuation is mainly due to the faradaic redox reaction between Ni (II) and Ni (III). The single obvious pair of redox peaks observed also indicates the relatively dense structure of Ni(OH)$_2$/NiOOH in agreement with our observation under SEM, because extra, distinct peaks may be observed from a porous structure.[31] Cyclic voltammetry was also performed on the bare substrate (Au-sputtered PC membrane), and since the resultant currents were much lower than those with Ni(OH)$_2$/NiOOH, the substrate effect is therefore neglected. The shifts of the peak current with increasing scan rates and the higher anodic peak current than the cathodic one indicates that the redox reactions were not ideally reversible.

Figure 7:
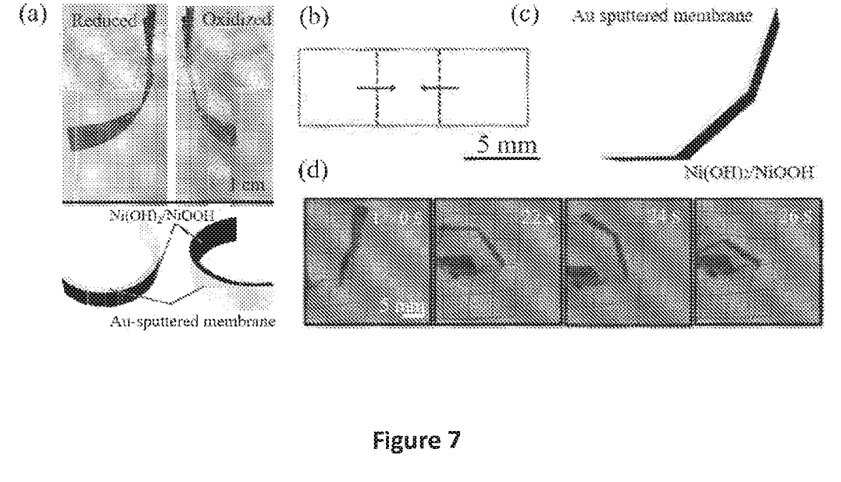
FIG. 7. A demonstration of biomimetic motions. (a) "Fishtail" movements for electrodepositing of 2.5 h at 3 V/s. (b) Folding creases. (c) Schematic of a foldable actuator. (d) Actuating performance in 1 M NaOH solution cyclic with a scan rate of 25 mV/s with potential window of 0.8 V (Supporting video 3).

The actuators could also demonstrate biomimetic motions. By applying a scan rate of 3 V/s within a potential window of 5 V (i.e. frequency being 0.3 Hz), the actuator could demonstrate biomimetic movements such as the fishtail motion with the largest curvature reducing to 0.24 mm$^{-1}$ (FIG. 7a). According to the CV curves, the mechanism of the volume change for the actuating layer is due to the redox reaction between the Ni(OH)$_2$/NiOOH couple. At a relatively higher scan rate (i.e. frequencies), ion diffusion is limited which reduces the actuation, while reversible and large deformation was still observed. The decreased curvature may be due to the inaccessibility of some active surface area for faradic reactions, which are suppressed and may not be fully completed at higher scan rates.

The present passive layer of PC is ductile and compliant enough to be foldable easily without breakage, which would be unavoidable in most metallic materials. This is an important requirement for making origami actuators which are based on folding, and can actuate in predetermined complex motions similar to, for example, the finger movement. A procedure to fabricate substrates with predesigned creases is schematically shown in FIG. 7b. An Au-sputtered PC membrane was first folded along the dotted lines before electrodeposition with $Ni(OH)_2/NiOOH$. The folding resulted in undulations in the subsequent electrodeposition of the active material along the creases, making the resultant actuator in FIG. 7c actuate in a predetermined complex motion mimicking well the movement of a finger as shown in FIG. 7d.

Intrinsic Actuating Characteristics of $Ni(OH)_2/NiOOH$.

Figure 8:
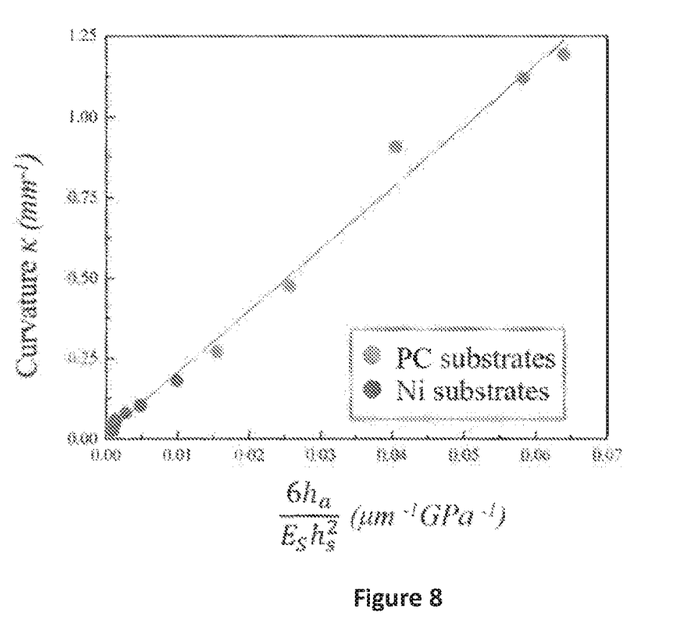
FIG. 8. Bending curvature κ vs 6 $h_a/E_s h_s^2$ for $Ni(OH)_2/NiOOH$ deposited on PC substrates (FIG. 4c) and on Ni substrates (FIG. 3a, Kwan et al. Sensors Actuators, B Chem. 248 (2017) 657-664).

Actuation tests were done on the film actuator with one end fixed and the other end free. The actuating layer ($Ni(OH)_2/NiOOH$) contracts or expands under stimulations and the supporting layer (substrate) remain unchanged, which would result in a bending movement. The actuation is therefore characterized by the curvature (K) of the film. Here, the intrinsic actuating stress characteristics of the $Ni(OH)_2/NiOOH$ material are analyzed using Eq (1), which tallies well with the results in FIG. 4c, showing that K is proportional to $h_a$ when $h_s$ is fixed. Furthermore, earlier work of the inventors has shown that, when the $Ni(OH)_2/NiOOH$ material of a constant thickness $h_a \approx 0.44$ μm is deposited on Ni substrates of different thicknesses $h_s$ from 1.2 to 5.5 μm, the bending curvature κ is inversely proportional to the square of $h_s$ (see FIG. 3a, Kwan et al. *Sensors Actuators, B Chem.* 248 (2017) 657-664), also in agreement with eq (1). In FIG. 8, data in FIG. 4c of the present work are plotted, as well as those in Kwan et al. [*Sensors Actuators, B Chem.* 248 (2017) 657-664], in a format anticipated from eq (1), namely, curvature κ vs 6 $h_a/E_s h_s^2$. As can be seen, the two groups of data on PC and Ni substrates respectively fall onto a common proportionality trend in agreement with eq (1). For the data on PC substrates, the thickness $h_s$ was measured by a stylus profiler (Bruker DektakXT®) to be 10 μm, and their Young modulus $E_s$ is 2.3 GPa as measured by nanoindentation. Here, the Au layer deposited on top of the PC substrate is ignored since it is very thin at just 14 nm. For the data on Ni substrates, the original device strains (D/L), where D is end-deflection of the cantilever actuators of length L, are converted into bending curvature κ by using the geometrical relation κ=2 (D/L)/{L[1+(D/L)$^2$]} which gives sufficient accuracy for the range studied.

The slope of the proportionality trend in FIG. 8 is 19.5±0.5 MPa, and according to eq (1), this should be the value of the intrinsic actuation stress $\sigma_a$ of the $Ni(OH)_2/NiOOH$ material. It is intriguing to see that, in FIG. 8, the proportionality trend spans over a large curvature range, from nearly zero to about 1.2 mm$^{-1}$. This means that the $Ni(OH)_2/NiOOH$ material is delivering a fairly constant actuating stress of 19.5±0.5 MPa over a large strain range. $h_a \ll h_s$ The average strain of the active layer (FIG. 8) is given by applying the simple beam-bending theory to the substrate, as $$\varepsilon_a = \frac{h_s \kappa}{2} \quad (2)$$

and so the largest $\varepsilon_a$ that corresponds to the largest curvature of 1.2 mm$^{-1}$ would be (10 μm×1.2 mm$^{-1}$)/2=0.6%. In other words, the results in FIG. 8 show that the $Ni(OH)_2/NiOOH$ material delivers a constant actuation stress at 19.5±0.5 MPa for strains up to at least 0.6%, which is the maximum value studied in the present work.

The performance of the actuating material can also be characterized by the work density U per cycle, namely, $U=\sigma_a\varepsilon_a$, or, from eq (2)

$$U = \frac{\sigma_a h_s \kappa}{2} \quad (3)$$

In FIG. 8, the maximum curvature κ studied here is 1.2 mm$^{-1}$ for a PC substrate of 10 μm thick, and so from eq (3), the maximum work density delivered by the $Ni(OH)_2/NiOOH$ during reduction is (19.5 MPa×10 μm×1.2 mm$^{-1}$)/2=117 kJ/m$^3$. FIG. 8 also shows that the actuation (curvature κ) is strongly dependent on the substrate, in which PC substrate enhances the actuation by ~5 times due to its lower elastic modulus. This indicates that the actuating layer can produce ~5 times higher actuating strain, and ~25 higher work density as it is proportional to the square of strain.

Thus, to summarize, the present $Ni(OH)_2/NiOOH$ material is shown to produce a constant actuating stress of 19.5±0.5 MPa, over strains up to 0.6%, and delivering a work density up to 117 kJ/m$^3$. The actuating stress of ~20 MPa here is large among electrochemical actuators, the work density of ~117 kJ/m$^3$ for the $Ni(OH)_2/NiOOH$ material also outperforms human skeletal muscles (~40 kJ/m$^3$) and is comparable to that of typical metallic muscles. Although it is smaller than ferroelectric polymers actuators (~920 kJ/m$^3$) and the best nanoporous noble alloys (~2 MJ/m$^3$), the present material is a lot cheaper than nanoporous noble metals, and the triggering voltage needed is under 1 volt, which is much lower than that of ferroelectric polymers (typically >1 kV). It is also important to realize that the maximum strain of 0.6% and work density of ~117 kJ/m$^3$ here are only the limits offered by the present passive substrates, and may not represent the intrinsic limits of the $Ni(OH)_2/NiOOH$ material. For example, if substrates even softer than the present PC are used, the actuation strain and work density may be further increased, under the same actuating stress of the active material. As the volume of unit cell of $Ni(OH)_2$ is known to contract by approximately 10% when it is oxidized into NiOOH further improvements of the actuating strain are highly possible by using more compliant substrates.

Another important feature demonstrated in the present study is the large device actuation response, with bending curvature up to 1.2 mm$^{-1}$ achieved (FIG. 4c). Eq (1) shows that a larger bending curvature can be achieved by a thicker actuating layer (increasing $h_a$), or reducing the rigidity of the passive substrate (decreasing $h_s$ or $E_s$). However, the current electrodeposition method for the $Ni(OH)_2/NiOOH$ material does not allow larger $h_a$ to be achieved—as FIG. 4c shows, the thickness of the active layer saturates to about 2 μm for prolonged electrodeposition time. Therefore, reducing the rigidity of the substrate is the only practical way to further increase the device strain. As can be seen in FIG. 8, switching the passive substrate from Ni (with $E_s \approx 220$ GPa) to PC (with $E_s \approx 2.3$ GPa) significantly increases the achievable bending curvature to beyond 0.2 mm$^{-1}$, reaching 1.2 mm$^{-1}$. Such high device strains can never be achievable on metal substrates with high $E_s$. Besides allowing high actuating strains, the soft and ductile PC membranes can also be folded into arbitrary and predetermined creases, while the same procedure might break a metallic substrate. As future applications, origami actuators capable of producing predesigned actuating motion based on predetermined patterns could be achieved from the present material system.

Long-Term Cyclic Actuation Performance.

Figure 9:
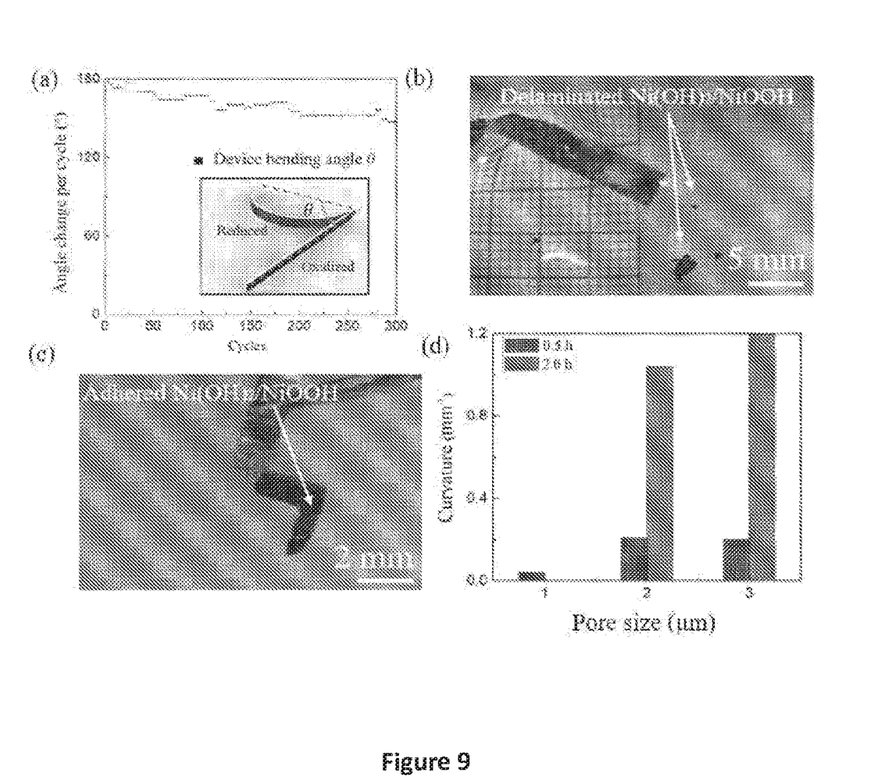
FIG. 9. (a) Device bending angle change over 300 cycles. The actuation test was performed under −1 to 2 V with scan rate 500 mV/s, in 1 M NaOH. (b-d) Effects of pore size in PC substrate on actuation performance and structural integrity. (b) An actuator made by electrodepositing the same active material on a non-porous PC membrane substrate for 2 hours. After only 5 cycles of CV actuation, significant delamination occurred. (c) An actuator made by electrodepositing the same active material on a porous PC membrane without obvious delamination. (d) Actuating performance of non-porous and porous membrane-based actuator for electrodepositing 0.5 h and 2 h.

FIG. 9a shows the change of the bending angle of an actuator over 300 cycles. On repeated actuation cycles, the actuation performance exhibited only minor degradation, with the average bending angle change of the last 50 cycles maintained at ~90% of the first 50 ones. The slight degradation may be due to the unavoidable cracks during repetitive ultra-large motions. There was also no significant sign of delamination of the $Ni(OH)_2$/NiOOH material from the PC substrate, due to the strong interlocking effect into the porous substrate especially at long electrodeposition time. During fabrication, the active material was deposited into the pores of the Au-sputtered PC membrane, thus significantly improving the adhesion between the actuating layer and the substrate, which is essential for the subsequent actuation performance. To show the importance of the interlocking effect of the substrate, another batch of actuators was made by electrodepositing the same active material on non-porous PC membranes, which would not provide any interlocking effect. On subsequent actuation testing, significant delamination of the active material (deposited for 2 h) from the substrate was observed only after five cycles (FIG. 9b). On the contrary, no delamination of actuating material electrodeposited (for 2 h) on Au-sputtered porous PC membrane was observed (FIG. 9c). This shows that the pores in the PC substrates of the present actuators may be pivotal in preventing delamination and therefore providing strong adhesion with the active material, which may be an important factor leading to large device actuation and durable performance. FIG. 9d shows the actuation curvature of actuators deposited for different times on Au-sputtered PC substrates of different pore sizes. On non-porous PC substrate, the actuation is very small, due to the significant delamination as mentioned above. The actuation performance on porous PC substrates with 0.03 μm and 3 μm is similar, although it is slightly better on 3 μm porous PC substrate with 2 h deposition time. For the same pore size (either 0.03 or 3 μm), prolonging electrodeposition of the active material from 0.5 h to 2 h leads to significant improvements in the actuation performance, presumably due to deeper interlocks formed into the pores of the substrate.

Oxides/Hydroxides of Other Metals, and Accelerated Fabrication.

Figure 10:
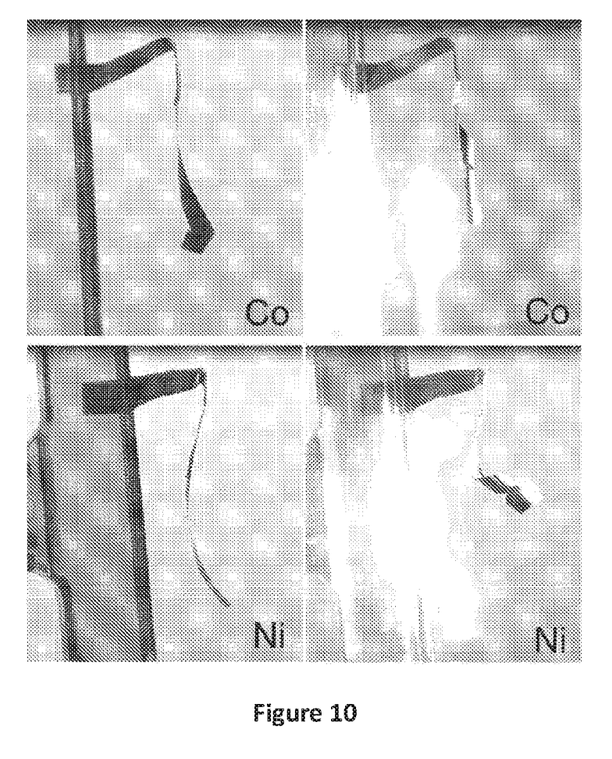
FIG. 10. Comparison of light-actuation of Co oxides/hydroxides and $Ni(OH)_2/NiOOH$ under the same light intensity and illumination time.

The oxides/hydroxides of metals other than nickel can exhibit better actuation performance. As shown in FIG. 10, a film actuator made of Co oxides/hydroxides can curl for 5 loops while that of $Ni(OH)_2$/NiOOH can only curl for 3 under the same light intensity and duration, corresponding to a curvature of 1.65 $mm^{-1}$ and 1.15 $mm^{-1}$ respectively. The actuating strains estimated, which depend on the curvature measured, and the thickness and elastic modulus of the actuating layers, show a 50% improvement in strain for Co oxides/hydroxides over $Ni(OH)_2$/NiOOH.

Figure 11:
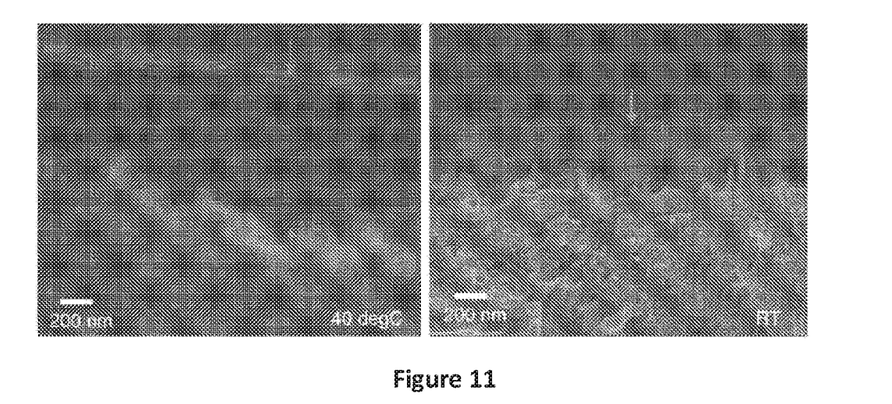
FIG. 11. SEM images showing the cross section of $Ni(OH)_2/NiOOH$ (pointed by red arrows) fabricated under 40° C. and room temperature.
Figure 12:
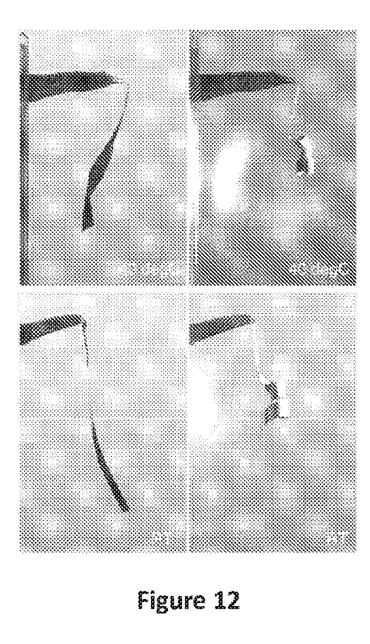
FIG. 12. Actuation of film actuators with $Ni(OH)_2/NiOOH$ layers fabricated under 40° C. and room temperature.

Increasing the electrodeposition temperature can shorten the fabrication time of the present actuating materials. As shown in FIG. 11, the thickness of $Ni(OH)_2$/NiOOH fabricated at 40° C. is about 950 nm while that at room temperature (RT, ~25° C.) is only 380 nm. While the intrinsic actuating strain of $Ni(OH)_2$/NiOOH remains the same since the substrate is unchanged, the actuators made in 40° C. and hence having a thicker $Ni(OH)_2$/NiOOH layer show higher actuation of 3 loops, compared to 2 loops for the one made at RT as shown in FIG. 12. To obtain a thickness of about 1 μm at room temperature, the fabrication time required would be about 2 hours.

Application Demonstration.

Figure 13:
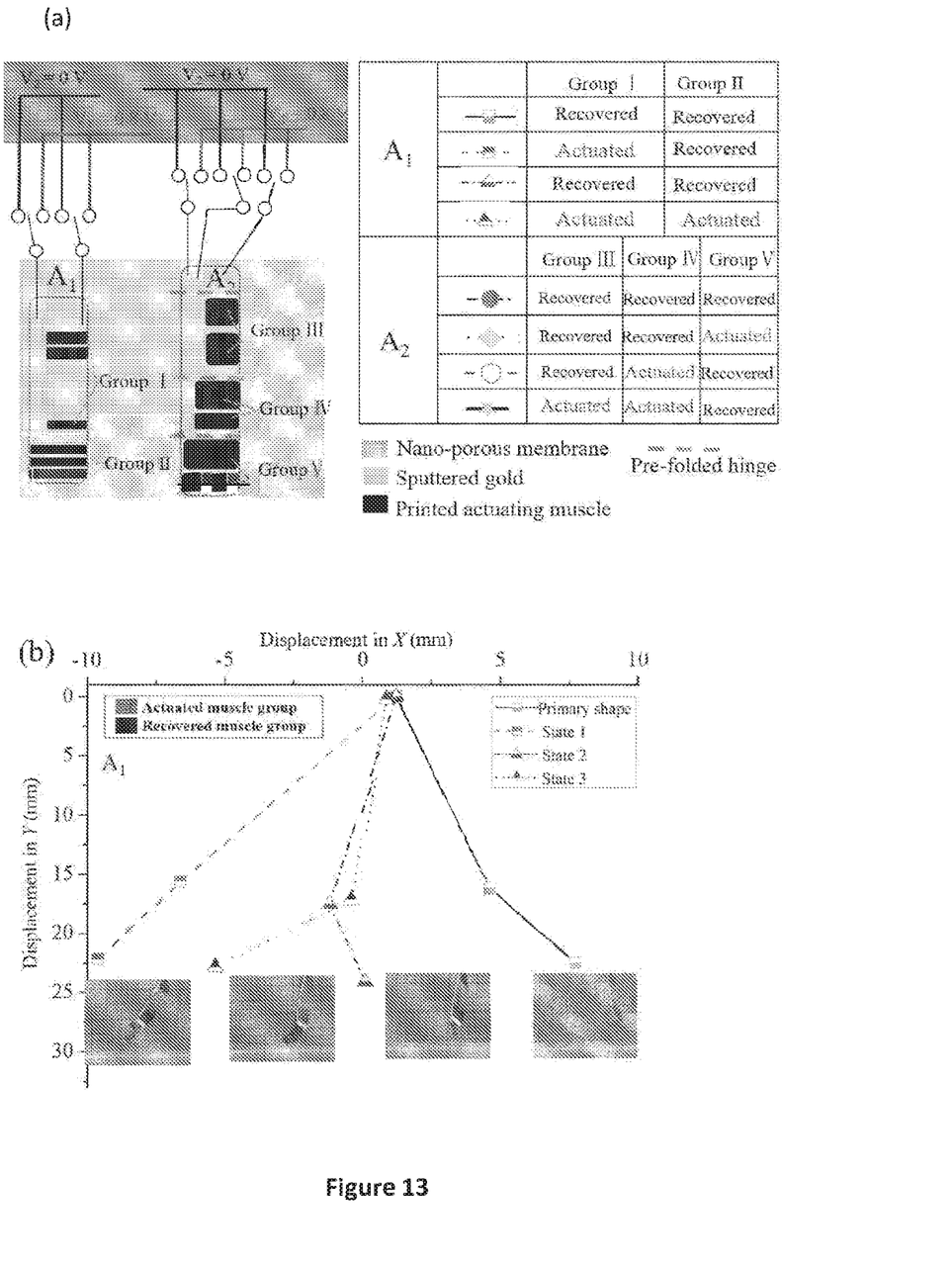
FIG. 13. Pre-designed patterns and input voltage connection (a) Comparison of foldable shape of printed actuators as (b) one actuator with two independently controlled muscle groups and (c) one actuator with three independently controlled muscle groups.

As a demonstration, a finger-mimicking actuator was made by direct printing of $Ni(OH)_2$/NiOOH onto porous PC membranes. The printed pattern designs as well as the input voltage connection are shown in FIG. 13a. Complex finger motions were achieved with the individual printed actuating area (muscle group) independently applied with the input voltage. Each "muscle group" consists of several predesigned actuating strips and was interlocked to the insulated sputtered gold layers which serve not only as the conductive support for local micro-electrodeposition but also as the electric circuit during the actuation performance. Under 0.8 V, the actuating material is oxidized, leading to the actuation of the muscle group. The actuated muscle groups can be recovered by reduction under 0.0 V.

A crucial property of the printed actuators is the independent control of each muscle group which is challenging for most printed micro-actuators. The bending motion was captured using a camera, and markers were attached to the same top corner of each muscle group area at different actuated states. FIG. 13b shows the folding deformation of the actuator with muscle group I, II, and both I and II were actuated. FIG. 13c plots the relationship of "fingertip" bending angle with selective input electrical stimuli and the difference between various bending states are demonstrated.

Actuators as described herein can be used in a variety of other applications. For example, actuators can be used in microfluidic devices, in which, for example, switching and valving functions can be performed by the actuator. In other cases, the actuator can be used as a pump to cause fluid flow in a channel or out of an orifice, including a pump for the controlled delivery of a substance such as a drug. In other embodiments, an actuator can be part of an external or implantable medical device. Actuators may also be part of micro electro mechanical systems (MEMS) devices such as micromirror arrays in which addressable micro actuators are individually actuated. In other cases, one or more actuators can be constructed and arranged to unfold into a structure upon application of a current/voltage/light. Such structures may be useful as tents or scaffolds, for example. In other cases, an actuator can be a component of a surgical tool or medical implant that can be electrically expanded or contracted by current/voltage/light.

With respect to any figure or numerical range for a given characteristic, a figure or a parameter from one range may be combined with another figure or a parameter from a different range for the same characteristic to generate a numerical range.

Other than in the operating examples, or where otherwise indicated, all numbers, values and/or expressions referring to quantities of ingredients, reaction conditions, etc., used in the specification and claims are to be understood as modified in all instances by the term "about."

While the invention is explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. An actuator, comprising:
   an active layer comprising at least one metal hydroxide, the active layer having a first volume under no stimulation and a second volume different from the first volume under stimulation; and
   a passive layer comprising a porous polymer membrane, the passive layer having an elastic modulus at least half of an elastic modulus of the active layer.

2. The actuator according to claim 1, wherein the at least one metal hydroxide comprises at least one metal selected from the group of nickel, cobalt, manganese, iron, aluminum, copper, and magnesium.

3. The actuator according to claim 1, wherein the porous polymer membrane comprises a polycarbonate or a polyester.

4. The actuator according to claim 1, wherein the stimulation is voltage, current, light, heat, or humidity or a combination of one, two or more stimulants.

5. A method of making an actuator, comprising:
   electrodepositing at a temperature above room temperature at least one metal hydroxide to form an active layer on a passive layer comprising a porous polymer membrane, the active layer having a first volume under no stimulation and a second volume different from the first volume under stimulation, the passive layer having an elastic modulus at least half of an elastic modulus of the active layer.

* * * * *